United States Patent
Kumar B et al.

(10) Patent No.: US 12,089,294 B2
(45) Date of Patent: Sep. 10, 2024

(54) METHOD AND APPARATUS FOR CONTROLLING PACKET FLOW

(71) Applicant: Samsung Electronics Co., Ltd., Suwon-si (KR)

(72) Inventors: Venkata Sunil Kumar B, Bangalore (IN); Vijay Kumar Mishra, Bangalore (IN); Bhagwan Dass Swami, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 17/283,006

(22) PCT Filed: Oct. 17, 2019

(86) PCT No.: PCT/KR2019/013645
§ 371 (c)(1),
(2) Date: Apr. 5, 2021

(87) PCT Pub. No.: WO2020/080843
PCT Pub. Date: Apr. 23, 2020

(65) Prior Publication Data
US 2021/0368352 A1    Nov. 25, 2021

(30) Foreign Application Priority Data

Oct. 17, 2018   (IN) .............................. 201811039328
Oct. 14, 2019   (IN) .............................. 201811039328

(51) Int. Cl.
*H04W 16/14*   (2009.01)
*H04W 76/14*   (2018.01)
*H04W 88/04*   (2009.01)

(52) U.S. Cl.
CPC ........... *H04W 88/04* (2013.01); *H04W 16/14* (2013.01); *H04W 76/14* (2018.02)

(58) Field of Classification Search
CPC ..... H04W 16/14; H04W 76/14; H04W 88/04; H04W 12/50; H04W 12/03
See application file for complete search history.

(56) References Cited

U.S. PATENT DOCUMENTS

2012/0272310 A1   10/2012   Souissi et al.
2016/0212759 A1*   7/2016   Schliwa-Bertling .......................
                                                                H04W 40/36
(Continued)

FOREIGN PATENT DOCUMENTS

WO    2014/060584 A1    4/2014

OTHER PUBLICATIONS

Design of a visible-light-communication enhanced WiFi system (Year: 2019).*

(Continued)

*Primary Examiner* — Omer S Mian

(57) ABSTRACT

The present disclosure relates to method and apparatus for controlling packet flow. In accordance with embodiments, the method includes aggregating a connection of at least one unlicensed frequency band and a connection of at least one licensed frequency band to form a hotspot backend connection for a hotspot access point providing an aggregated bandwidth spectrum. The method includes allocating the aggregated bandwidth spectrum to at least one tethered device connected with the hotspot access point through a tethered connection. The method includes receiving one or more packets from the at least one tethered device via a hotspot interface at the hotspot access point. The method includes transmitting the one or more packets to a transport layer aggregator.

12 Claims, 14 Drawing Sheets

(56) References Cited

U.S. PATENT DOCUMENTS

2016/0219589 A1\* 7/2016 Khawer ................ H04W 24/02
2016/0337177 A1 11/2016 Lindoff et al.
2018/0115438 A1 4/2018 Park et al.
2021/0114616 A1\* 4/2021 Altman .............. G01C 21/3889
2022/0174050 A1\* 6/2022 Anderson ........... H04L 63/0471

OTHER PUBLICATIONS

Carrier Aggregation/Channel Bonding in Next Generation Cellular Networks: Methods and Challenges (Year: 2014).\*
International Search Report dated Jan. 23, 2020 in connection with International Patent Application No. PCT/KR2019/013645, 4 pages.
Written Opinion of the International Searching Authority dated Jan. 23, 2020 in connection with International Patent Application No. PCT/KR2019/013645, 6 pages.

\* cited by examiner

METHOD AND APPARATUS FOR CONTROLLING PACKET FLOW

CROSS-REFERENCE TO RELATED APPLICATIONS

This application is a 371 of International Application No. PCT/KR2019/013645 filed on Oct. 17, 2019, which claims priority to India Patent Application No. 201811039328 filed on Oct. 17, 2018 and India Patent Application No. 201811039328 filed on Oct. 14, 2019 in the India Intellectual Property Office, the disclosures of which are herein incorporated by reference in their entirety.

BACKGROUND

1. Field

The present disclosure generally relates multi-spectrum tethering and, in particular, relates to method and apparatus for controlling packet flow in such multi-spectrum tethering.

2. Description of Related Art

With the advent of technology in the realm of telecommunication, wireless local area networking or Wi-Fi In recent times, significant growth and development are witnessed in the realm of telecommunication. With the availability of Wi-Fi, many mobile devices, such as smartphones, are now able to support Wi-Fi sharing. Further advancement is towards providing a better user experience in terms of higher data rates, low latency, etc. Worldwide implementation of Fourth Generation (4G) cellular network technology has made mobile hotspots very popular as the mobile hotspot uses the Fourth Generation-Long Term Evolution (4G-LTE) network to provide connectivity to multiple user equipment (UEs). Examples of the UEs include, but not limited to, mobile devices such as smartphones, laptops, tablets, smartwatches, etc., desktop, personal digital assistance (PDA), Internet of Things (IoT) devices such as smart TV, smart speakers, etc.

FIG. 1 illustrates an example network environment 100 depicting mobile hotspot enabled by 4G-LTE, i.e., "Wi-Fi Hotspot" or "LTE tethering", as known in the art. The network environment 100 may include a communication device 102, for e.g., smartphone, availing 4G-LTE connectivity or mobile data connectivity from a network provider. The communication device 102 may operate as a hotspot access point and may create the Wi-Fi Hotspot. The hotspot access point may then enable 4G-LTE connectivity to a plurality of UEs 104-1, 104-2, 104-N connected with the communication device 102.

FIG. 2 illustrates an example network environment 200 depicting Wi-Fi tethering enabled by Wi-Fi network, i.e., "Wi-Fi Sharing", as known in the art. The network environment 100 may include a communication device 202, for e.g., smartphone, availing Wi-Fi connectivity or Wi-Fi data connectivity from a Wi-Fi access point 204, for e.g., Wi-Fi router. The communication device 102 may operate as a hotspot access point and may enable Wi-Sharing. The hotspot access point may enable Wi-Fi connectivity to a plurality of UEs 204-1, 204-2 . . . 204-N connected with the communication device 102.

FIG. 3 illustrates an example of network environment 300 depicting a packet flow in Wi-Fi hotspot or Wi-Fi sharing, as known in the art. The network environment 300 may include a client device or UE 202 connected to a hotspot access point 204 to avail data connectivity, for e.g., LTE connectively or Wi-Fi connectivity, as illustrated in FIG. 1 and FIG. 2. The client device 202 can be the same as the plurality of UEs 104-1, 104-2 . . . 104-N as illustrated in FIG. 1 or can be same as the plurality of UEs 204-1, 204-2 . . . 204-N as illustrated in FIG. 2. The hotspot access point 204 can be same as the communication device 102 as illustrated in FIG. 1 or can be same as the communication device 202 as illustrated in FIG. 2.

The client device 302 may send a packet(s) of data from an output interface (0/P I) to the hotspot access point 304 using Transmission Control Protocol (TCP). The hotspot access point 304 may receive the packet(s) over a dedicated hotspot interface (H/S I). The hotspot interface may forward the packet(s) to an output interface for delivery to other client devices (s) (not shown in the figure) or host server(s) (not shown in the figure) over the Internet.

In an example, the hotspot access point 304 may provide Wi-Fi connectivity. As would be understood, in such an example, the output interface of the client device 302 and the hotspot access point 304 may be a wireless LAN interface, wlan0. Similarly, the hotspot interface may be a wireless LAN interface, swlan0. In an example, the hotspot access point 204 may provide LTE connectivity. As would be understood, in such example, the output interface of the client device 302 and the hotspot access point 304 may be LTE interface, rmnet0.

With the advent of Fifth Generation (5G) cellular network technology, the mobile devices are now capable of providing multiple network connectivity, for e.g., 4G-LTE connectivity, Wi-Fi connectivity, Bluetooth connectivity, 5G connectivity, etc., simultaneously in addition to having mobile hotspot (MHS) capabilities. This enables better utilization of network connectivity as the mobile device is now able to access the combined spectrum of 4G and 5G, also known as spectrum aggregation. To this end, network provides will aggregate spectrum within frequency bands, across frequency bands; bond spectrum across platforms and on top of shared spectrum allocations (multiple users and licensing methods in one block of spectrum).

FIG. 4 illustrates an example of network environment 400 depicting a communication device 402, for e.g., smartphone, availing aggregated spectrum, as known in the art. The network environment 400 may include a data server 404, a core Network (NW) device 406, and an Evolved Packet Core (EPC) 408. The data server 404, the core NW device 406, and the EPC 408 may be in communication with each other. In an example, the communication between the data server 404, the core NW device 406, and the EPC 408 may occur at a rate of more than 5 GB per second. Further, the EPC 408 may be in communication with a Long-Term Evolution (LTE) or a 4G eNodeB (eNB) 410 and a 5G gNodeB (gNB) 412. The 4G eNB 410 and the 5G eNB 410 may provide licensed spectrum. As would be understood, the licensed spectrum is available for use by network operators, service providers, etc., upon payment of license fees.

The communication device 402 may be connected with the 4G eNB 410 to access 4G connectivity. The communication device 402 may be connected with the 5G eNB 410 to access 5G connectivity. The communication device 402 may now avail aggregated spectrum of 5G and 4G. Further, the communication device 402 may operate as a mobile hotspot (MHS) and provide connectivity to UEs 414-1. In addition, the communication device 402 may connected to UEs 414-2 through USB connectivity, e.g., USB 3.0.

Further, in order to improve the performance of a session from the mobile device, for e.g., the communication device 402, which is directly connected to eNodeB, for e.g., the 4G eNB 410 and the 5G gNB 412, multi-pathing (MP) transport protocols are implemented. Examples of such MP transporting protocols include, but not limited to, MultiPath TCP, MultiPath QUIC. The MP transporting protocols enable parallel utilization of multiple network connectivity or interfaces, for e.g., LTE and Wi-Fi.

However, such spectrum aggregation and MP transporting protocols do not work for client devices connected to the mobile device when the mobile device is operating as an MHS access point. In addition, packet(s) received from the client device are forwarded through the LTE output interface of the MHS access point. This leads to congestion of licensed spectrum provided by LTE connectivity.

FIG. 5 illustrates an example network environment 500 depicting a communication device 502, for e.g., smartphone, operating as MHS access point and controlling a packet flow, as known in the art. The communication device 502 (hereinafter interchangeably referred to as "MHS access point 502") may be connected with a Wi-Fi access point 504 to avail Wi-Fi connectivity. The MHS access point 502 may be connected with an LTE access point 506 to avail LTE connectivity. The Wi-Fi connectivity and the LTE connectivity may enable the MHS access point 502 to access host server(s) 508 over the Internet through spectrum aggregation.

The MHS access point 502 may enable Wi-Sharing. The MHS access point 502 may enable Wi-Fi connectivity to a plurality of UEs 510-1, 510-2 . . . 510-N connected with the MHS access point 502. The plurality of UEs 510-1, 510-2 . . . 510-N may send packet(s) of data from an output interface, i.e., wlan0, to the MHS access point 502. The MHS access point 502 may receive the packet(s) over a dedicated hotspot interface, i.e., swlan0.

Now, the MHS access point 502 may implement TCP/IP stack with MPTCP as the network protocol. As would be understood, MPTCP enables the simultaneous use of several IP-addresses/interfaces by spreading data or packets across several sub-flows. For the sake of brevity only two sub-flows are depicted. One sub-flow is connected with an output interface for the Wi-Fi connectively, i.e., wlan0, and another sub-flow is connected with an output interface for the LTE connectivity, i.e., rmnet0. As such, packets from the application residing on the MHS access point 502 can flow through the sub-flows (depicted using dashed arrows) and get benefited by MPTCP and receive aggregated throughput as a result. However, the packets received from the plurality of UEs 512-1, 512-2 . . . 512-N are directly forwarded to the output interface for the LTE connectivity, i.e., rmnet0, (depicted using dashed-dotted arrow). Due to this direct packet-forwarding, packets from plurality of UEs 512-1, 512-2 . . . 512-N completely bypass transport layer aggregators. This leads to non-availability of aggregated throughput to the plurality of UEs 512-1, 512-2 . . . 512-N.

Further, only licensed spectrum from the LTE access point 504 is used to provide the hotspot backend for the MHS. This leads to a high possibility of network congestion with the MHS access point 502. Offloading to unlicensed spectrums cannot be done in the current realization of LTE Hotspot. As would be understood, the unlicensed spectrums are available for use by all users, network operators, etc., without any license payments or controls, within certain conditions, such as a limit on total transmission power. Examples of the unlicensed spectrum include, but not limited to, Wi-Fi spectrum and 5G unlicensed spectrums.

With 3GPP standards body defining 5G-New Radio (5G-NR), there some solutions that provide the aggregated 4G (licensed) and 5G (licensed) spectrum as an MHS. In one example solution, the unlicensed spectrum is aggregated. As such, two or more unlicensed frequency bands are aggregated and provided as a third unlicensed band. In one another example solution, wireless devices are grouped for extending the WLAN connectivity. As such, a wireless device can communicate with a group of devices that are themselves wireless interconnected with another group of devices. However, such solutions are not able to provide aggregated spectrum of licensed spectrum and unlicensed spectrum, and further providing the aggregated spectrum to the client devices connected with the MHS access point.

Thus, there exists a need for a solution to overcome the above-mentioned deficiencies.

Embodiments of the present disclosure provide method and apparatus for controlling packet flow.

SUMMARY

This summary is provided to introduce a selection of concepts in a simplified format that is further described in the detailed description of the present disclosure. This summary is not intended to identify key or essential inventive concepts of the claimed subject matter, nor is it intended for determining the scope of the claimed subject matter. In accordance with the purposes of the disclosure, the present disclosure as embodied and broadly described herein describes method and apparatus for controlling packet flow.

In accordance with an embodiment, the method for controlling packet flow is disclosed. The method includes aggregating a connection of at least one unlicensed frequency band and a connection of at least one licensed frequency band to form a hotspot backend connection for a hotspot access point providing an aggregated bandwidth spectrum. The method includes allocating the aggregated bandwidth spectrum to at least one tethered device connected with the hotspot access point through a tethered connection. The method includes receiving one or more packets from the at least one tethered device via a hotspot interface at the hotspot access point. The method includes transmitting the one or more packets to a transport layer aggregator.

In accordance with the embodiment, an apparatus for controlling packet flow is disclosed. The apparatus includes a controlling module and a proxy module coupled to the controlling module. The controlling module is configured to aggregate a connection of at least one unlicensed frequency band and a connection of at least one licensed frequency band to form a hotspot backend connection for a hotspot access point to provide an aggregated bandwidth spectrum. The controlling module is configured to allocate the aggregated bandwidth spectrum to at least one tethered device connected with the hotspot access point through a tethered connection. The controlling module is configured to receive one or more packets from the at least one tethered device via hotspot interface at the hotspot access point. The proxy module is configured to transmit the one or more packets to a transport layer aggregator.

The advantages of the present disclosure include, but not limited to, providing aggregation benefits of transport layer aggregator such as aggregated bandwidth of licensed frequency and unlicensed frequency and enhanced throughput to the at least one tethered device. Further, providing aggregation benefits does not need any modification in applications, existing network protocols, kernel, middlebox or server and is platform-independent.

These aspects and advantages will be more clearly understood from the following detailed description taken in conjunction with the accompanying drawings and claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
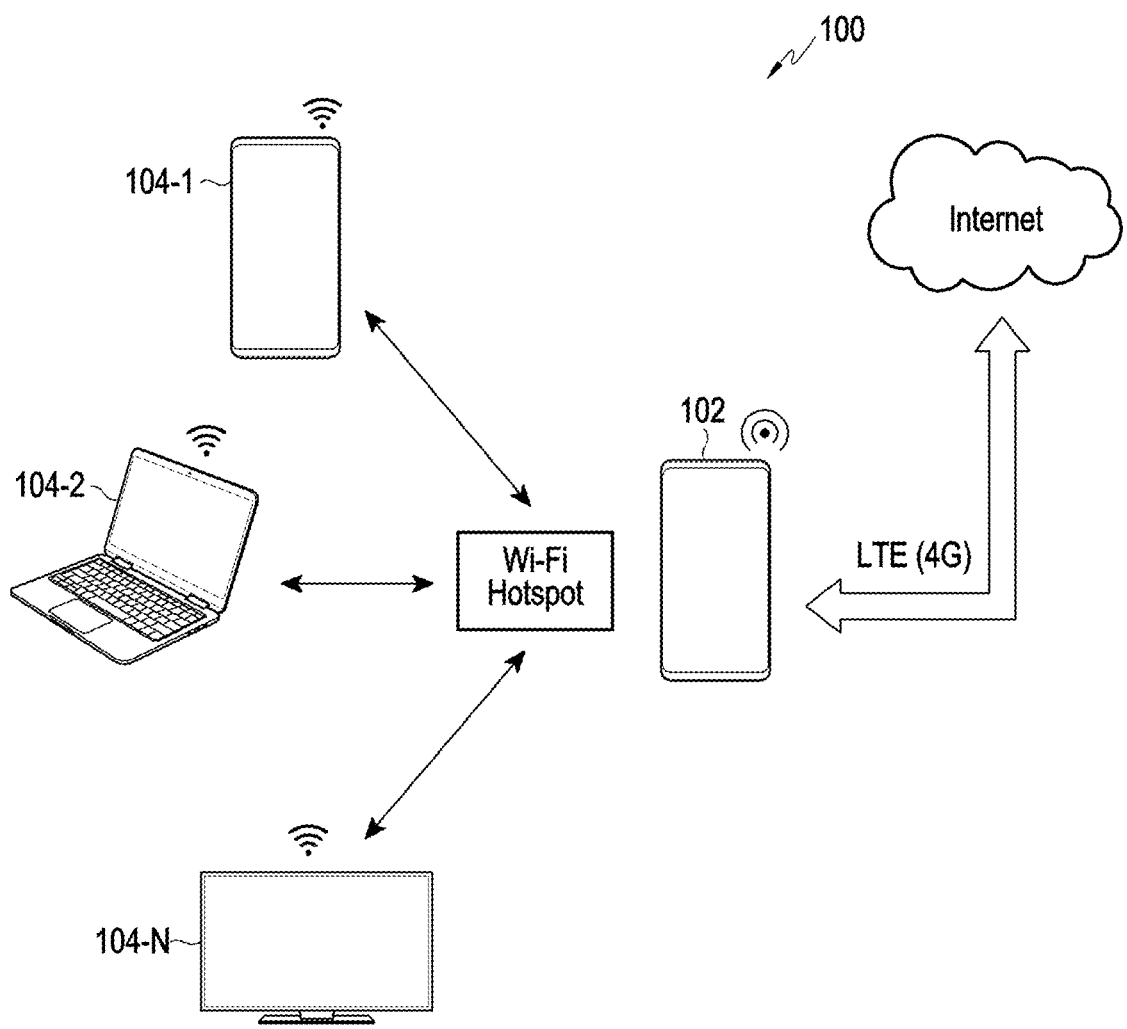
FIG. 1 illustrates an example network environment depicting mobile hotspot enabled by 4G-LTE, as known in the art.
Figure 2:
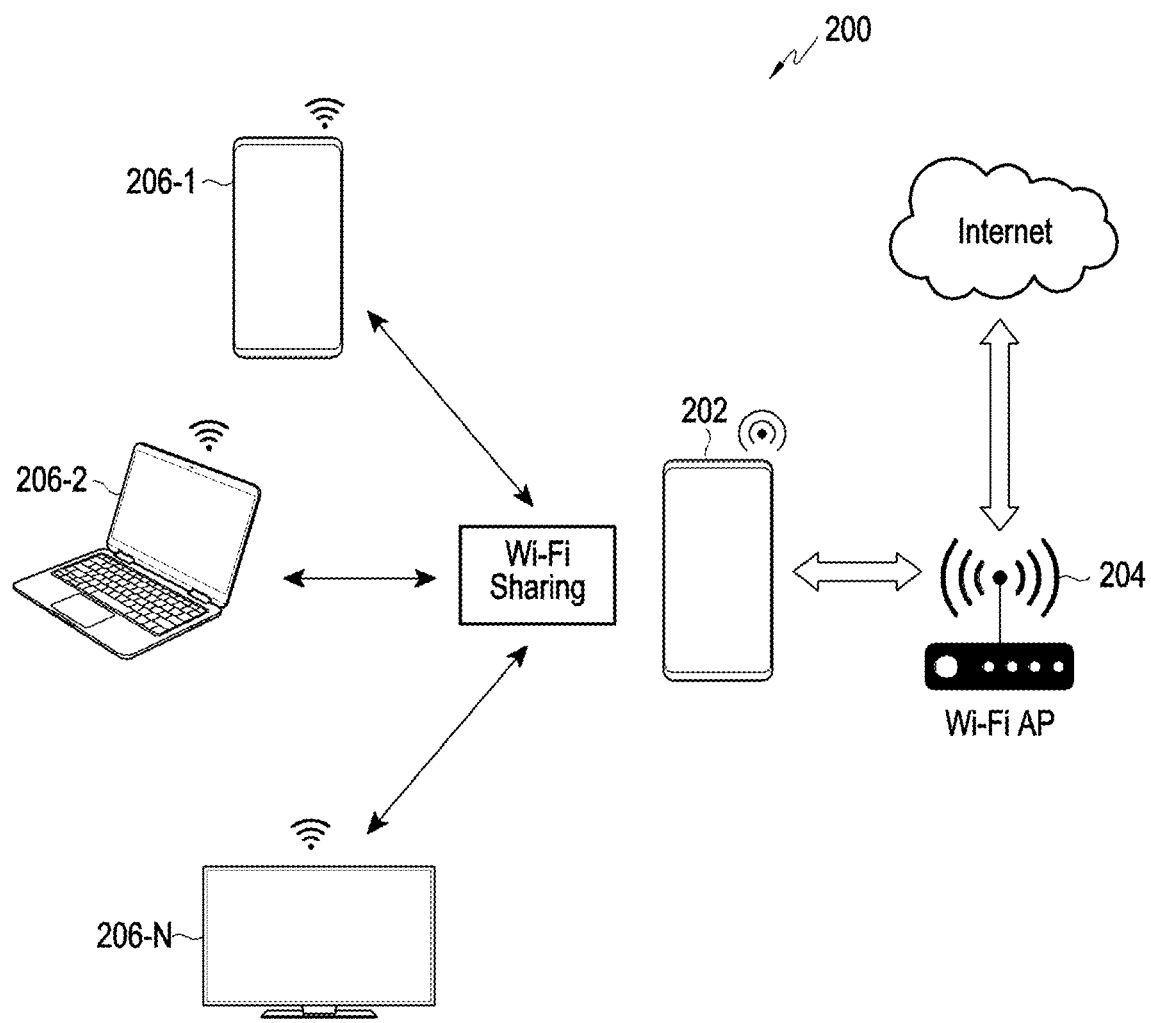
FIG. 2 illustrates an example network environment depicting Wi-Fi tethering enabled by Wi-Fi network, as known in the art
Figure 3:
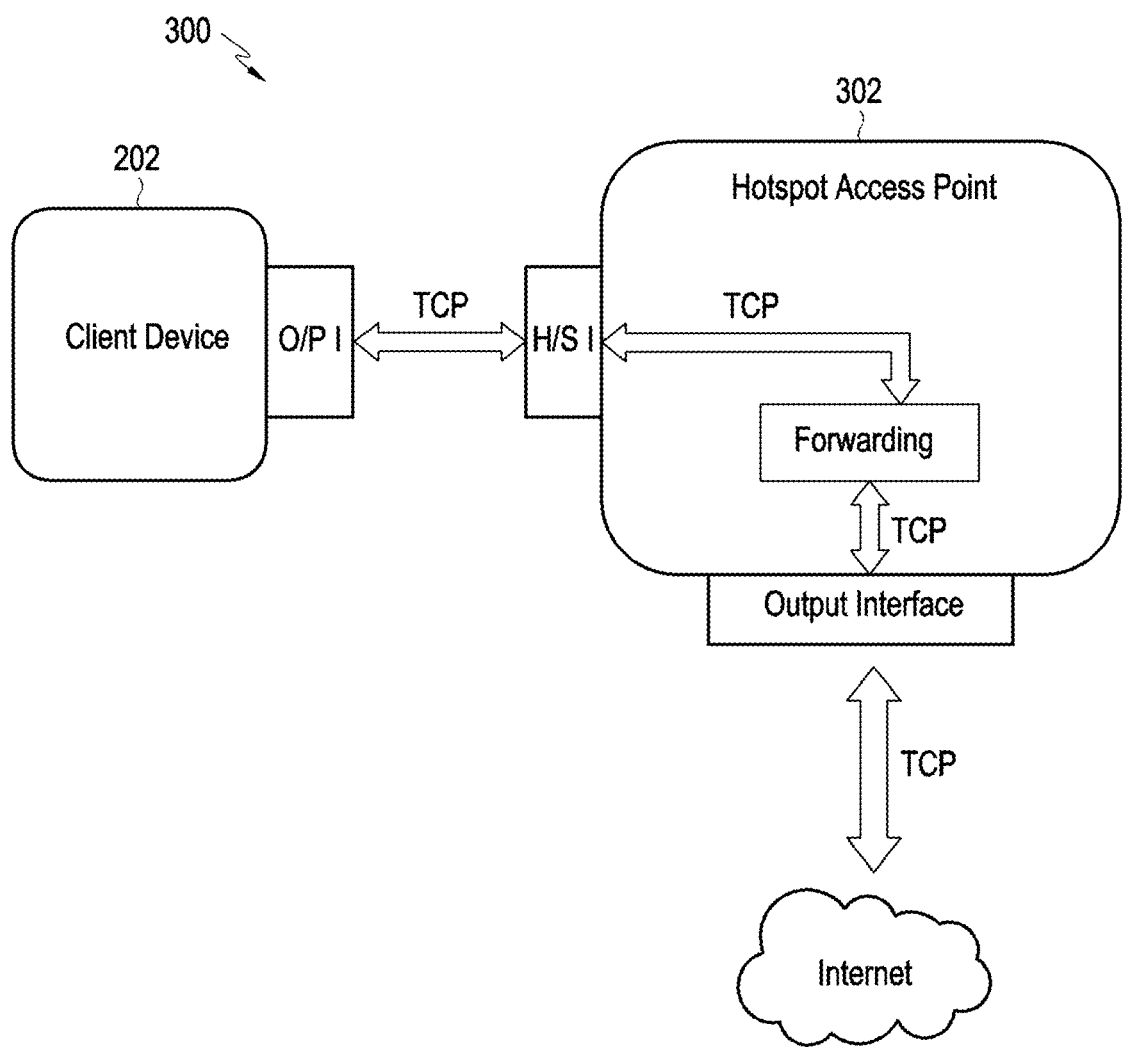
FIG. 3 illustrates an example network environment depicting packet flow in Wi-Fi hotspot or Wi-Fi sharing, as known in the art.
Figure 4:
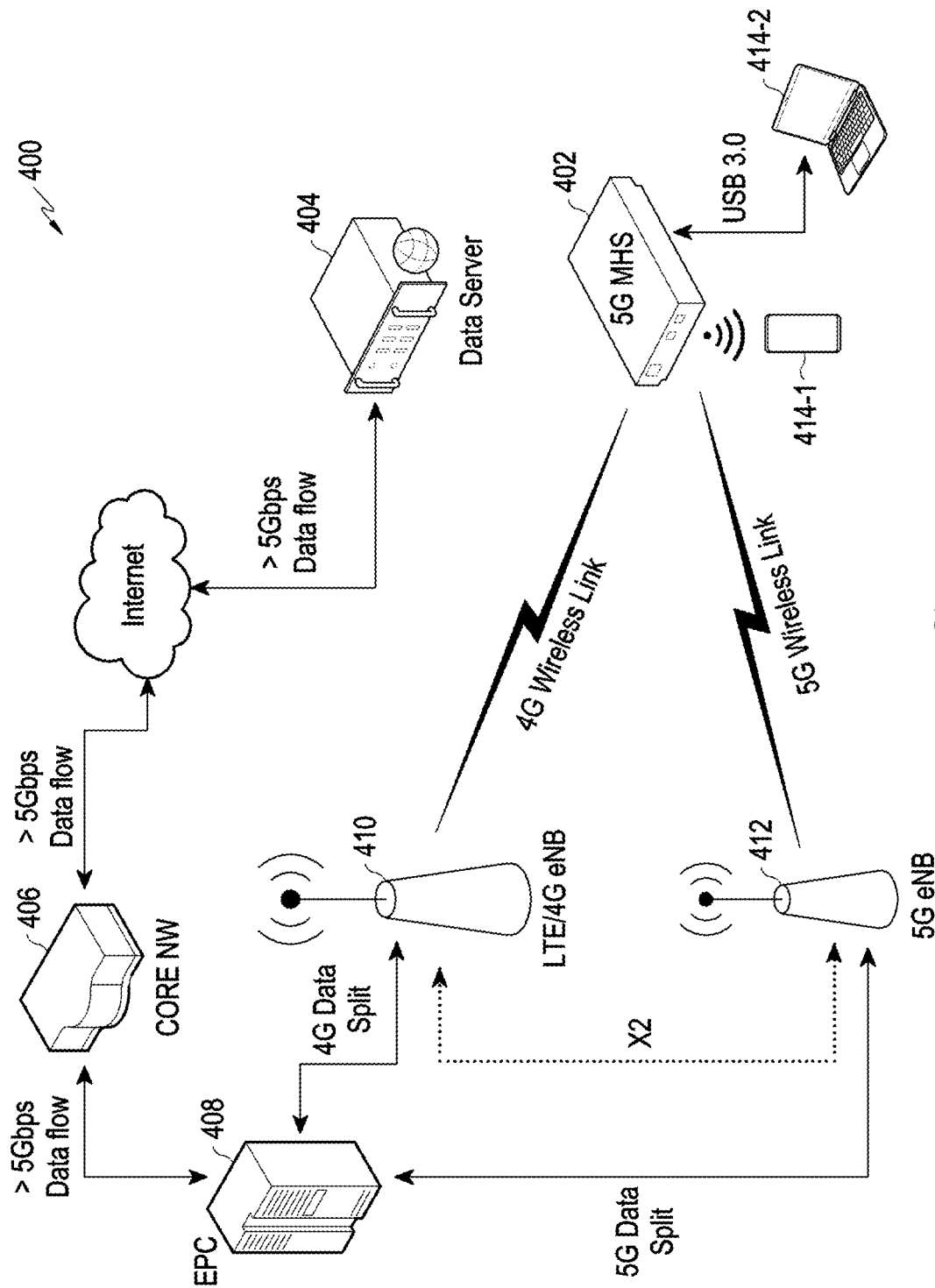
FIG. 4 illustrates an example network environment depicting a communication device, availing aggregated spectrum, as known in the art.
Figure 5:
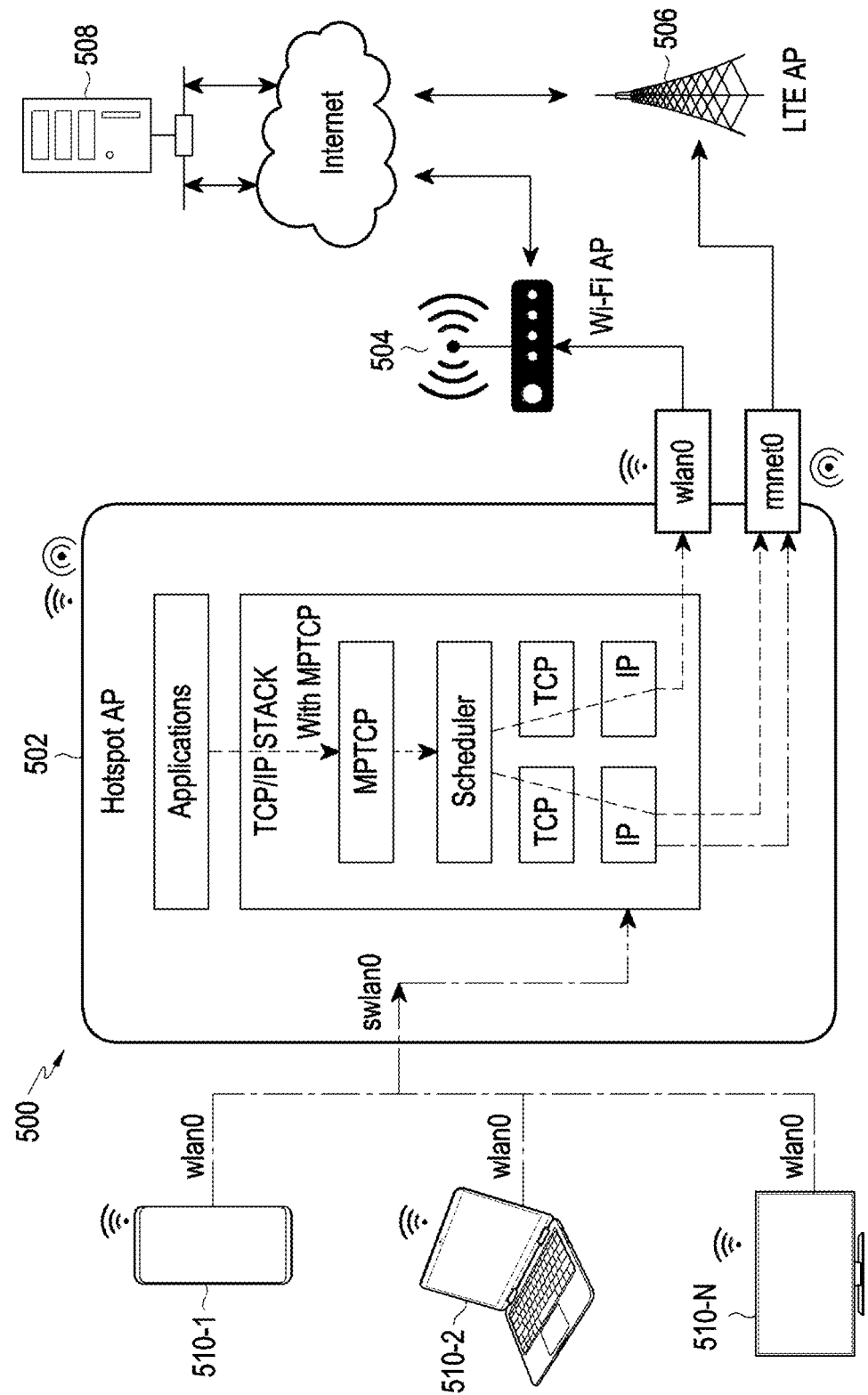
FIG. 5 illustrates an example network environment depicting the communication device operating as a mobile hotspot (MHS) access point and controlling a packet flow, as known in the art.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated apparatus, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The apparatus, methods, and examples provided herein are illustrative only and not intended to be limiting.

Embodiments of the present disclosure will be described below in detail with reference to the accompanying drawings.

Figure 6:
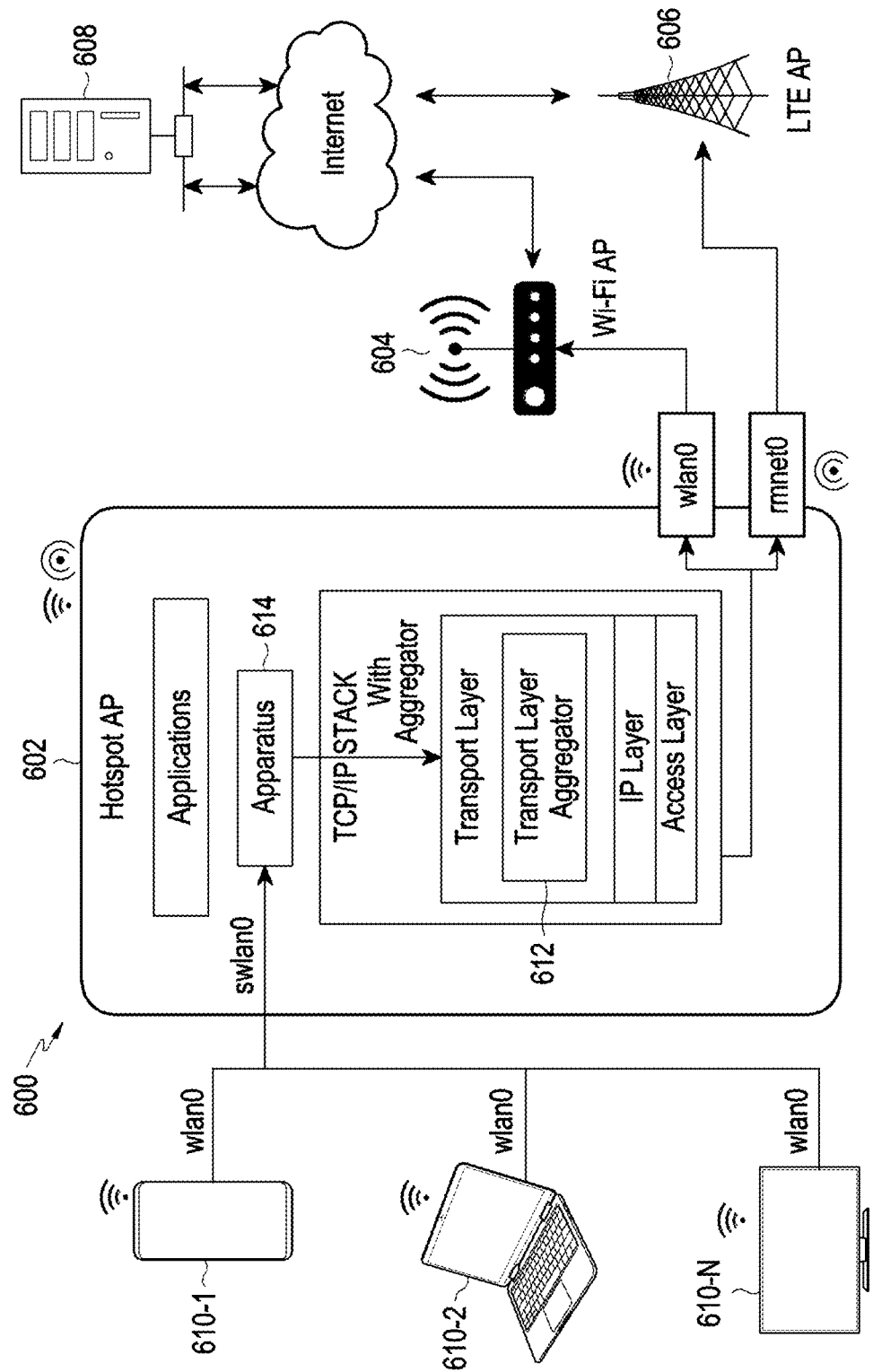
FIG. 6 illustrates an example network environment depicting a communication device operating as a hotspot access point controlling packet flow, in accordance with some embodiments of the present disclosure.

FIG. 6 illustrates an example network environment 100 depicting a communication device 602 operating as hotspot access point controlling packet flow, in accordance with some embodiments of the present disclosure. Examples of the communication device 602 include, but not limited to, mobile devices such as smartphones, laptops, tablets, smartwatches, etc., desktop, personal digital assistance (PDA). The communication device 602 may include a plurality of applications that enable a user of the communication device 602 to avail various services. Examples of the applications include, but not limited to, browsing application, chat application, media sharing application, social network application, video calling applications, voice calling application, email application, etc.

The communication device 602 may be connected with a Wi-Fi access point 604 to avail Wi-Fi connectivity. The communication device 602 may be connected with an LTE access point 606 to avail LTE connectivity. The Wi-Fi connectivity and the LTE connectivity may enable the communication device 602 to access host server(s) 608 of the applications over the Internet. The communication device 602 may be enabled to operate as a mobile hotspot (MHS) access point, interchangeably referred to as hotspot access point 602. In an example, the communication device 602 may be enabled to operate as MHS access point by receiving a user-input indicative of selecting a corresponding icon on settings page.

Further, the hotspot access point 602 may enable Wi-Sharing. As such, the hotspot access point 602 may enable Wi-Fi connectivity to a plurality of user-equipment (UE) or devices 610-1, 610-2 . . . 610-N connected or tethered with the hotspot access point 602. The plurality of devices 610-1, 610-2 . . . 610-N (hereinafter referred to "tethered devices 610" in plurality and "tethered device 610" in singularity) may send packet(s) of data from an output interface, i.e., wlan0, to the hotspot access point 602. The hotspot access point 602 may receive the packet(s) over a dedicated hotspot interface, i.e., swlan0. The hotspot interface may connect the hotspot access point 602 with the tethered devices 610 through a tethered connection. Examples of the UEs or tethered devices include, but not limited to, mobile devices such as smartphones, laptops, tablets, smartwatches, etc., desktop, personal digital assistance (PDA), Internet of Things (IoT) devices such as smart TV, smart speakers, etc.

Further, the hotspot access point 602 may implement a TCP/IP stack with a transport layer aggregator 612. The transport layer aggregator 612 may be defined within a transport layer of the TCP/IP stack to provide enhanced features/services in the TCP/IP including multi-pathing (MP) transport protocols. The transport layer aggregator 612 enables at least one of various services such as a multi-connectivity service for transmitting packets on multiple flows (for e.g., MPTCP); a multi-connectivity service for multi-piping (for e.g. Multi-piping); a multi-connectivity service for capacity aggregation; a service for secure packet transmission (for e.g., MPSEC); a service for packet peeking and routing; and a service for nextgen-transport control protocol, etc.

Thus, in accordance with the present embodiments, the transport layer aggregator 612 enables spectrum aggregation at the hotspot access point 602 and as such the hotspot access point 602 may access the Internet through spectrum aggregation or a combination of spectrums as provided by both the Wi-Fi access point 604 and the LTE access point 606. The Wi-Fi connectivity and the LTE connectivity may enable the communication device 602 to access the host server(s) 608 of the applications over the Internet through spectrum aggregation. As described earlier, the transport layer aggregator 612 also implements MP transport protocols. Examples of such MP transporting protocols include, Multi Path TCP, Multi Path QUIC. The MP transporting protocols enable parallel utilization of multiple network connectivity or interfaces, for e.g., LTE and Wi-Fi. In an example, MPTCP enables simultaneous use of several IP-addresses/interfaces by spreading data or packets across several sub-flows. The sub-flows are individually connected with an output interface for the Wi-Fi connectivity, i.e., wlan0, and with an output interface for the LTE connectivity, i.e., rmnet0. As such, packets from the applications residing on the hotspot access point 602 can flow through the sub-flows and get benefited by MPTCP and receive aggregated throughput as a result.

In accordance with the present embodiments, the hotspot access point 602 includes an apparatus 614 to control a flow of one or more packets from the tethered devices 610. As such, the apparatus 614 may aggregate a connection of at least one unlicensed frequency band and a connection of at least one licensed frequency band to form a hotspot backend connection for the hotspot access point 602 to provide an aggregated bandwidth spectrum. Referring to the FIG. 6, the apparatus 614 may aggregate a connection of at least one unlicensed frequency band as provided by the Wi-Fi access point 604 and a connection of at least one licensed frequency band as provided by the LTE access point 606 to form a hotspot backend connection or backhaul connection for the communication device 602. The hotspot backend connection may now provide an aggregated bandwidth spectrum to the communication device 602. The apparatus 614 may allocate the aggregated bandwidth spectrum to the at least one tethered device 610 connected with the hotspot access point 602 through the tethered connection. As such, the apparatus 614 may enable the wireless connectivity to the tethered devices 610 through the hotspot backend connection and the tethered connection.

The apparatus 614 may receive one or more packets from at least one tethered device 610 via the hotspot interface, swlan0. The apparatus 614 may transmit the one or more packets to the transport layer aggregator 612 (as depicted using arrows). As such, the one or more packets received from the plurality of tethered devices 610 are not directly forwarded to the output interface for the Wi-Fi connectivity, i.e., wlan0, but to both the output interface for the Wi-Fi connectivity, i.e., wlan0, and the output interface for the LTE connectivity, i.e., rmnet0. Thus, the apparatus 614 may enable extending transport layer aggregator 612 to the tethered devices 610. This enables the tethered devices 610 to avail benefits of the transport layer aggregator 612.

Constructional and operational details of the apparatus 614 and the communication device 602 are explained in detail in the description of FIG. 7 to FIG. 13.

Figure 7:
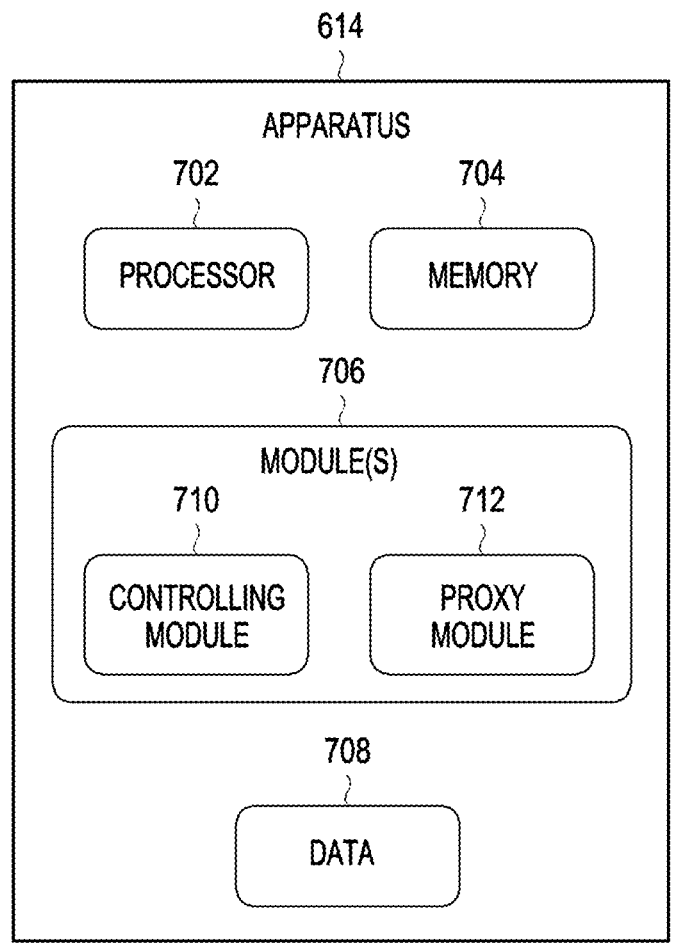
FIG. 7 illustrates a schematic block diagram of an apparatus for controlling packet flow in the hotspot access point, in accordance with some embodiments of the present disclosure.

FIG. 7 illustrates a schematic block diagram of the apparatus 614 for controlling packet flow in the hotspot access point, in accordance with some example embodiments of the inventive concepts. The apparatus/apparatus 614 may include a processor 702, a memory 704, module(s) 706 and/or data 708. The processor 702, the memory 704, and the module(s) 706 may be communicatively coupled with each other. The data 708 may serve, amongst other things, as a repository for storing data processed, received, and/or generated by the module(s) 706.

The processor 702 may be a single processing unit or a number of units, all of which could include multiple computing units. The processor 702 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 702 may be configured to fetch and/or execute computer-readable instructions and/or data (e.g., the data 708) stored in the memory 704.

The memory 704 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The module(s) 706, amongst other things, may include routines, programs, objects, components, data structures, etc., which perform particular tasks or implement data types. The module(s) 706 may also be implemented as, signal processor(s), state machine(s), logic circuitries, and/or any other device or component that manipulate signals based on operational instructions.

Further, the module(s) 706 may be implemented in hardware, instructions executed by at least one processing unit, for e.g., processor 702, or by a combination thereof. The processing unit may comprise a computer, a processor, a state machine, a logic array and/or any other suitable devices capable of processing instructions. The processing unit may be a general-purpose processor which executes instructions to cause the general-purpose processor to perform operations or, the processing unit may be dedicated to performing the required functions. In some example embodiments, the module(s) 706 may be machine-readable instructions (software) which, when executed by a processor/processing unit, perform any of the described functionalities.

In an embodiment, the module(s) 706 may include a controlling module 710 and a proxy module 712. The controlling module 710 and the proxy module 712 may be in communication with each other.

Figure 8:
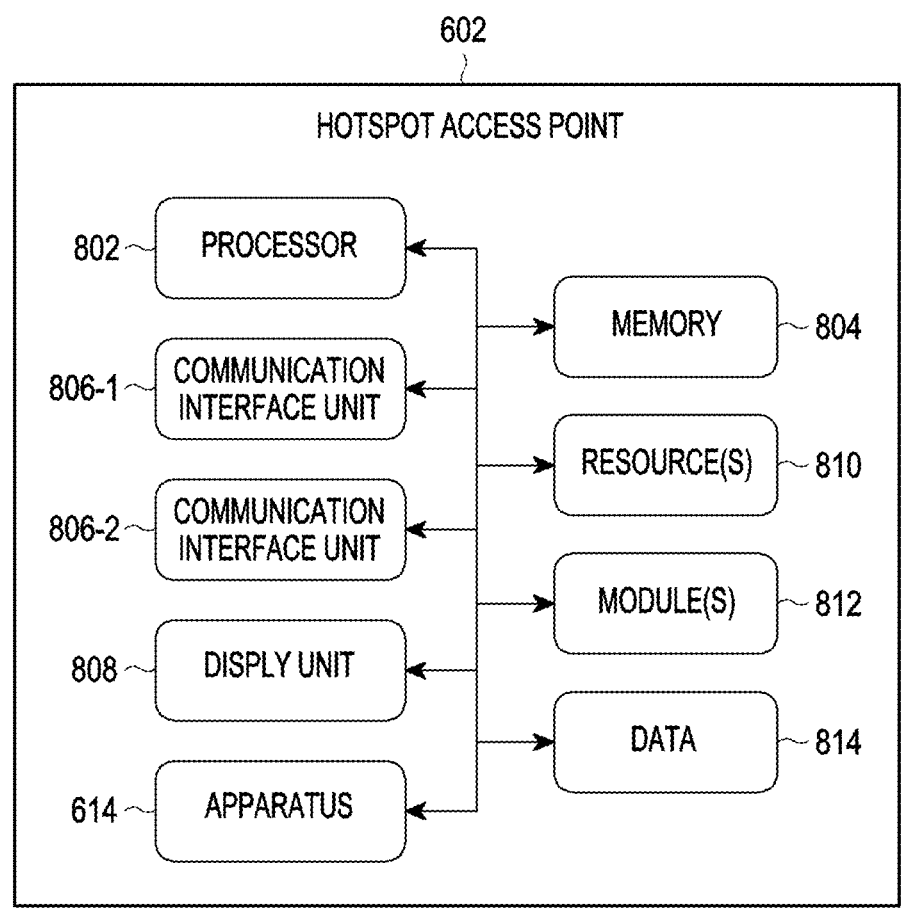
FIG. 8 illustrates a first example schematic block diagram of the communication device comprising the apparatus as illustrated in FIG. 7, in accordance with some embodiments of the present disclosure.

FIG. 8 illustrates a first example schematic block diagram of the communication device 602 comprising the apparatus 614 as illustrated in FIG. 7, in accordance with some embodiments of the present disclosure.

The communication device 602 may include at least one processor 802 (also referred to herein as "the processor 802"), a memory 804, a plurality of communication interface units, a display unit 808, resource(s) 810, module(s) 812, data 814, and/or the apparatus 614. The processor 802, the memory 804, the plurality of communication interface units, the display unit 808, the resource(s) 810, the module(s) 812 and/or the apparatus 614 may be communicatively coupled with each other via a bus (illustrated using directional arrows). The communication device 602 may also include one or more input devices (not shown in the figure) such as a microphone, a stylus, a number pad, a keyboard, a cursor control device, such as a mouse, and/or a joystick, etc., and/or any other device operative to interact with the communication device 602. The communication device 602 may also include one or more output devices (not shown in the figure) such as speakers, etc. Further, the data 814 may serve, amongst other things, as a repository for storing data processed, received, and/or generated (e.g., by the module(s) 812).

The processor 802 may be a single processing unit or a number of units, all of which could include multiple computing units. The processor 802 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 802 may be configured to fetch and/or execute computer-readable instructions and/or data (e.g., the data 814) stored in the memory 804. In an example embodiment, the processor 702 of the apparatus 614 may be integrated with the processor 802 during manufacturing of the communication device 602.

The memory 804 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. In an example embodiment, the memory 704 of the apparatus 614 may be integrated with the memory 804 during the manufacturing of the communication device 602.

The plurality of communication interface units may enable (e.g., facilitate) communication by the communication device 602 with access points and the tethered devices 610. For the sake of brevity, two communication interface units 806-1 and 806-2 are illustrated. The communication interface unit 806-1 can enable communication with the Wi-Fi access point 604 and the communication interface unit 806-2 can enable communication with the LTE access point 606. The display unit 808 may display various types of information (for example, media contents, multimedia data, text data, etc.) to a user of the communication device 602.

The display unit 808 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

The resource(s) 810 may be physical and/or virtual components of the communication device 602 that provide inherent capabilities and/or contribute towards the performance of the device 300. Examples of the resource(s) 810 may include, but are not limited to, a memory (e.g., the memory 804), a power unit (e.g. a battery), a display unit (e.g., the display unit 808), etc. The resource(s) 810 may include a power unit/battery unit, a network unit (e.g., the communication interface unit 806-1, 806-2), etc., in addition to the processor 802, the memory 804, and the display unit 808.

The module(s) 812, amongst other things, include routines, programs, objects, components, data structures, etc., which perform particular tasks or implement data types. The module(s) 812 may also be implemented as, signal processor(s), state machine(s), logic circuitries, and/or any other device and/or component that manipulate signals based on operational instructions.

Further, the module(s) 812 may be implemented in hardware, instructions executed by a processing unit, or by a combination thereof. The processing unit may comprise a computer, a processor, such as the processor 802, a state machine, a logic array and/or any other suitable devices capable of processing instructions. The processing unit may be a general-purpose processor which executes instructions to cause the general-purpose processor to perform operations or, the processing unit may be dedicated to performing the functions. In another aspect of the present disclosure, the module(s) 812 may be machine-readable instructions (software) which, when executed by a processor/processing unit, may perform any of the described functionalities.

In an embodiment, the module(s) 812 may include the apparatus 614. In an embodiment, the apparatus 614 may be implemented as part of the processor 802. In an embodiment, the apparatus 614 may be external to both the processor 802 and the module(s) 812. According to some example embodiments, operations described herein as being performed by any or all of the apparatus 614, the module(s) 706, the controlling module 710, the proxy module 712, may be performed by at least one processor (e.g., the processor 802) executing program code that includes instructions (e.g., the module(s) 706 and/or the module(s) 812) corresponding to the operations. The instructions may be stored in a memory (e.g., the memory 804).

Figure 9:
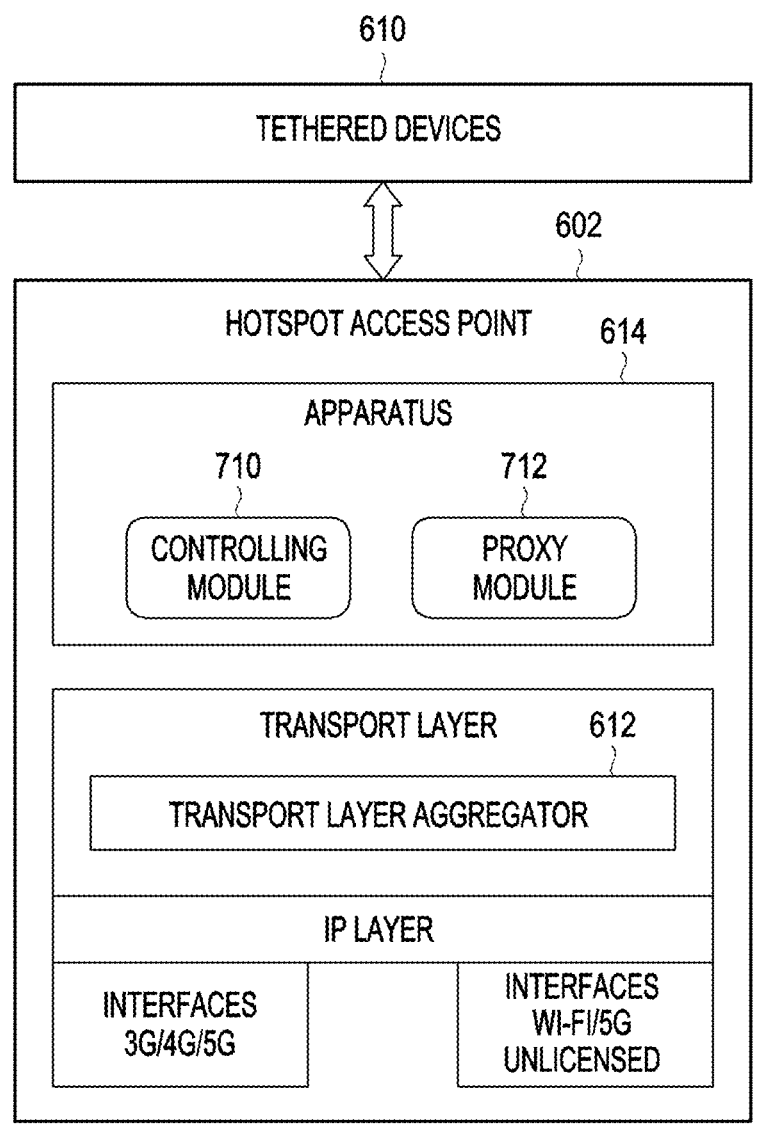
FIG. 9 illustrates a second example schematic block diagram of the communication device comprising the apparatus as illustrated in FIG. 7, in accordance with some embodiments of the present disclosure.

FIG. 9 illustrates a second example schematic block diagram of the communication device comprising the apparatus as illustrated in FIG. 7, in accordance with some embodiments of the present disclosure. The apparatus 614 may be communicatively coupled with the transport layer aggregator 612 in the communication device 602 operating as the hotspot access point. As such, the apparatus 614 may reside between the dedicated hotspot interface, swlan0, and the transport layer in a kernel of the communication device 602. The controlling module 710 may control a flow of packets from the tethered devices 610 such that the packets are not directly forwarded or directed or transmitted to the output interface for the LTE connectivity, i.e., rmnet0. Thus, the controlling module 710 may receive one or more packets from the tethered device 610 via the hotspot interface, swlan0, and forward to the proxy module 712. To this end, the controlling module 710 may use predefined rules to direct the packets from the dedicated hotspot interface, swlan0, to the proxy module 712. In an example, the predefined rules are stored as Iptables or any generic table structure in the memory 804 or the memory 704.

Upon receiving the one or more packets from the controlling module 710, the proxy module 712 may transmit the one or more packets to the transport layer aggregator 612. As such, the proxy module 712 may act as an application layer entity, residing in the hotspot access point 602, to complete protocol message exchanges on behalf of the tethered devices 610 with the transport layer aggregator 612. The proxy module 712 may also perform forward-protocol message exchange with the transport layer aggregator 612 through the dedicated hotspot interface, swlan0. Thereafter, the proxy module 712 may determine at least one communication parameter of the one or more packets. The at least one communication parameter comprises a size of the one or more packets, a quality of service, and a reliability factor. The proxy module 712 may determine the communication parameter using techniques or mechanisms as known in the art. The proxy module 712 may then encapsulate the one or more packets with at least one encapsulating parameter to form one or more encapsulated packets. The at least one encapsulating parameter comprises at least one of a device address of the hotspot access point 602 and a reference address of the at least one tethered device 610. The proxy module 712 may determine the encapsulating parameter using techniques or mechanisms as known in the art. The proxy module 712 may transmit the one or more encapsulated packets to the transport layer aggregator 612 based on the at least one communication parameter.

Thus, the controlling module 710 and the proxy module 712 may provide an abstraction for the tethered devices 610, thereby preventing the tethered devices 610 from internal dependencies on the transport layer aggregator 612 in the kernel of the hotspot access point 602. In addition, the controlling module 710 and the proxy module 712 may provide an abstraction to the transport layer aggregator 612 such that the packets from the tethered devices 610 are treated as packets received from the applications available on the hotspot access point 602.

Figure 10:
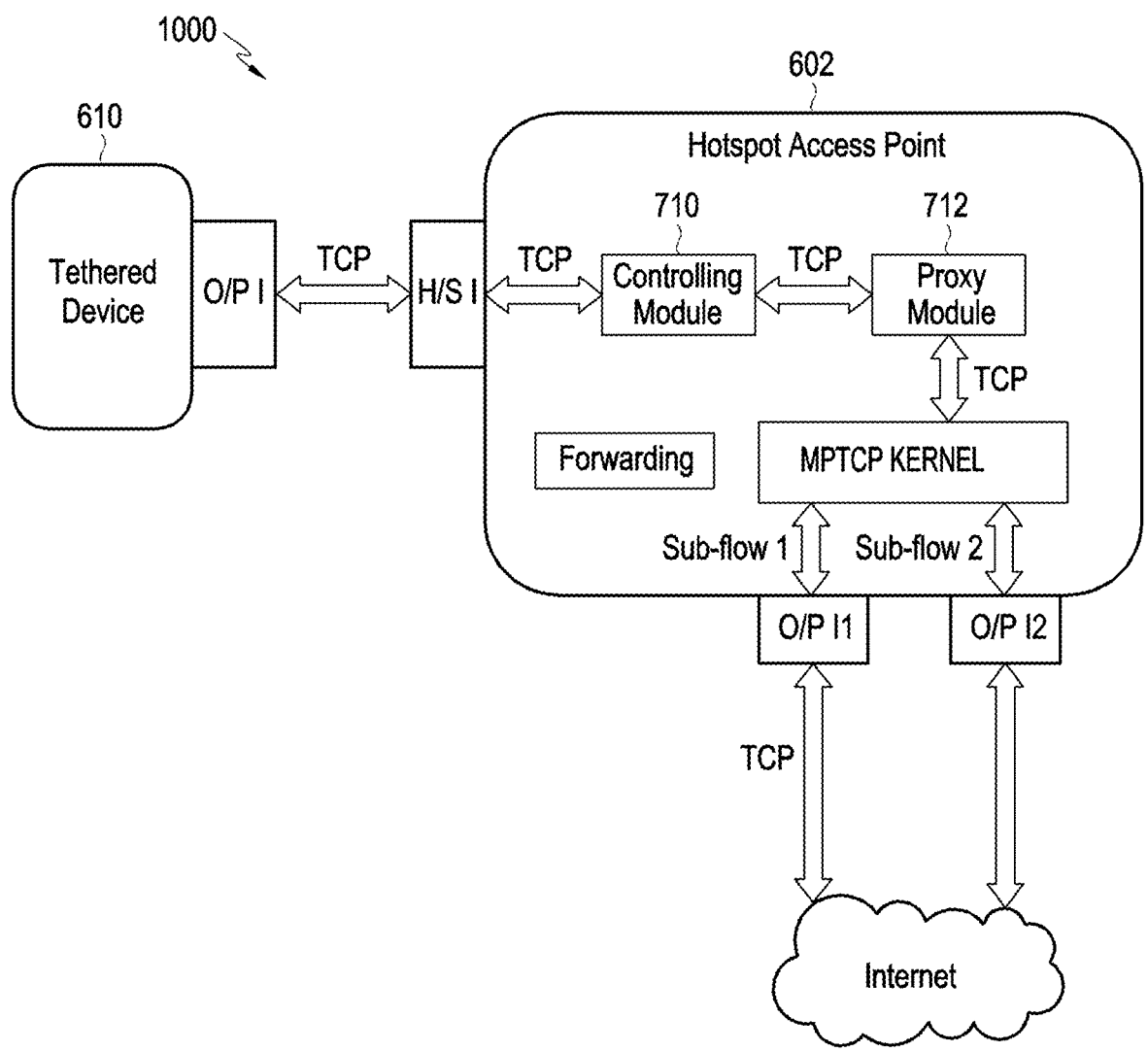
FIG. 10 illustrates an example network environment depicting controlling the packet flow by the apparatus, in accordance with some embodiments of the present disclosure.

FIG. 10 illustrates an example network environment 1000 depicting controlling the packet flow by the apparatus 614, in accordance with some embodiments of the present disclosure. In the example, the transport layer aggregator 612 implements MPTCP protocol and MPSEC protocol in the kernel of the communication device 602 or the hotspot access point 602. The tethered device 610 may be connected with the hotspot access point 602 to avail plurality of connectivity. The tethered device 610 may send packet(s) of data from the output interface (0/P I), i.e., wlan0 to the hotspot access point 602 using Transmission Control Protocol (TCP). The hotspot access point 604 may receive the packet(s) over the dedicated hotspot interface (H/S I), i.e., swlan0.

The controlling module 710 may prevent a direct transmission or forwarding of the one or more packets to at least one of the plurality of output interfaces, O/P I1 and O/P I2, of the hotspot access point 602. The output interface O/P I1 can be wlan0 and the output interface O/P I2 can be rmnet0. The controlling module 710 may transmit the one or more packets to the proxy module 712, as described earlier. The proxy module 712 may encapsulate the packets with at least one encapsulating parameter and transmit the encapsulated packet to the transport layer aggregator 612, as described earlier.

Further, the proxy module 712 may encrypt at least one of a payload, a control information, and a header in the one or more encapsulated packets to form one or more encrypted packets. The proxy module 712 may form the encrypted packet in accordance with the MPSEC protocol, as known in the art. The proxy module 712 may then transmit the one or more encrypted packets through a plurality of sub-flows of the transport layer aggregator 612 to the plurality of output interfaces, O/P I1 and O/P I2. The proxy module 712 may transmit or distribute the one or more encrypted packets packet in accordance with the MPTCP protocol, as known in the art. In the figure, for the sake of brevity, only two sub-flows are illustrated. Sub-flow 1 may transmit the encrypted packet(s) to the output interface O/P I1. Sub-flow 2 may transmit the encrypted packet(s) to the output interface O/P I2.

Further, the proxy module 712 may detect an error in one or more sub-flows from the plurality of sub-flows. The proxy module 712 may detect the error in accordance with the MPSEC protocol, as known in the art. The proxy module 712 may terminate the one or more sub-flows in response to detecting the error. As such, the proxy module 712 may retransmit the one or more encrypted packets through remaining sub-flows. The proxy module 712 may terminate the sub-flow and retransmit the packet through remaining sub-flows in accordance with the MPSEC protocol, as known in the art. In the illustrated example, the proxy module 712 may terminate the sub-flow 1 upon detecting an error and may retransmit the packet from the sub-flow 2.

Figure 11:
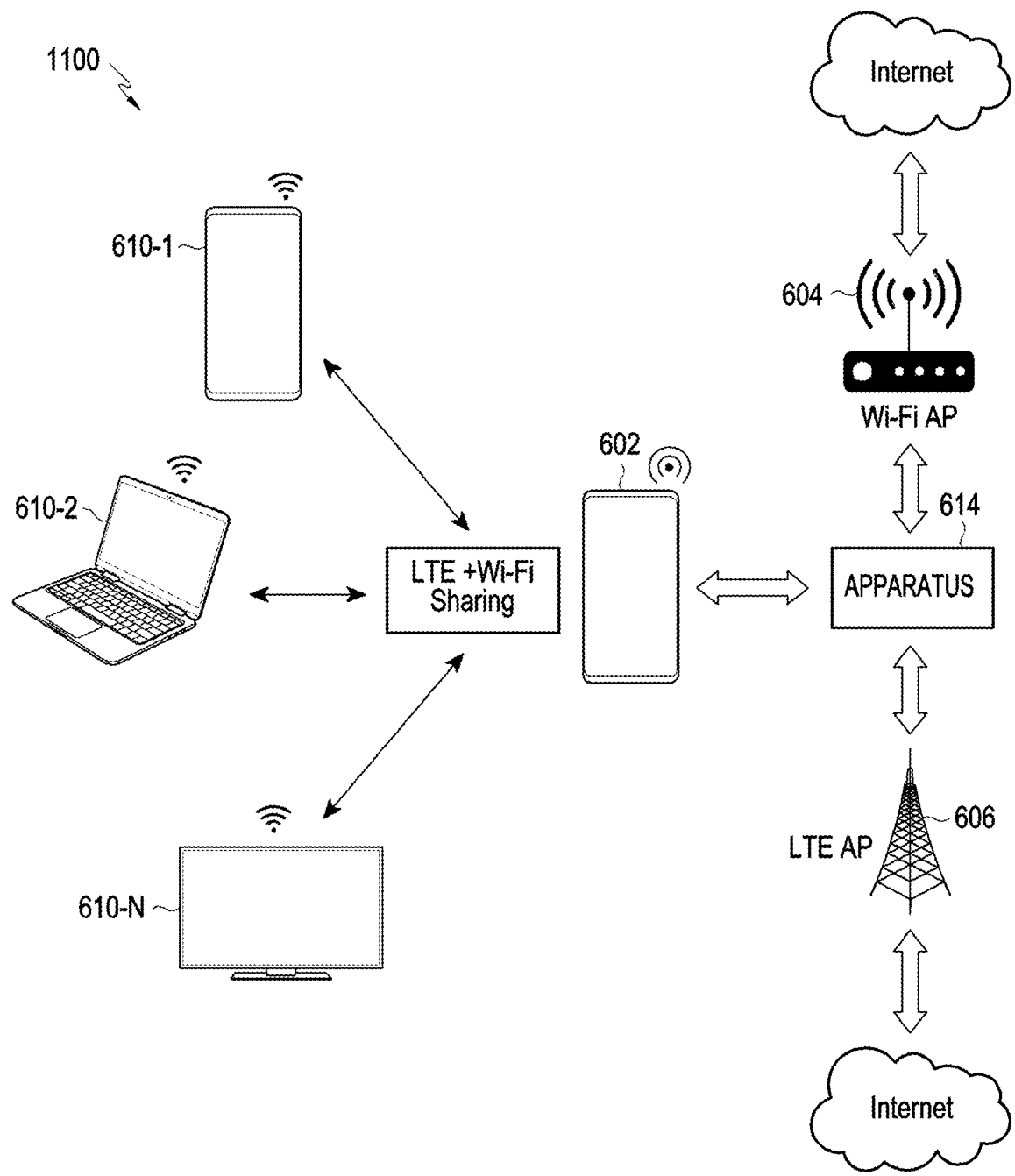
FIG. 11 illustrates an example network environment depicting tethered devices availing aggregated or combined LTE and Wi-Fi spectrum enabled by the apparatus, in accordance with some embodiments of the present disclosure.

FIG. 11 illustrates an example network environment 1100 depicting the tethered devices 610 availing aggregated or combined LTE and Wi-Fi spectrum enabled by the apparatus 614, in accordance with some embodiments of the present disclosure. As described earlier, the communication device 602 may be connected with the Wi-Fi access point 604 to avail Wi-Fi connectivity. The communication device 602 may be connected with the LTE access point 606 to avail LTE connectivity. To avail aggregated spectrum, the controlling module 710 may aggregate a connection of at least one unlicensed frequency band as provided by the Wi-Fi access point 604 and a connection of at least one licensed frequency band as provided by the LTE access point 606 to form the hotspot backend connection or the backhaul connection for the communication device 602. The hotspot backend connection may now provide an aggregated bandwidth spectrum to the communication device 602.

The communication device 602 may be enabled to operate as mobile hotspot (MHS) access point, interchangeably referred to as the hotspot access point, as described earlier. Upon enabling, the hotspot access point 602 may enable "LTE+Wi-Sharing" to provide connectivity to the tethered devices 610. As such, the controlling module 710 may allocate the aggregated bandwidth spectrum to the at least one tethered device 610 connected with the hotspot access point 602 through the tethered connection. Further, the controlling module 710 may enable a wireless connectivity to the at least one tethered device 610 through the hotspot backend connection and the tethered connection.

Figure 12:
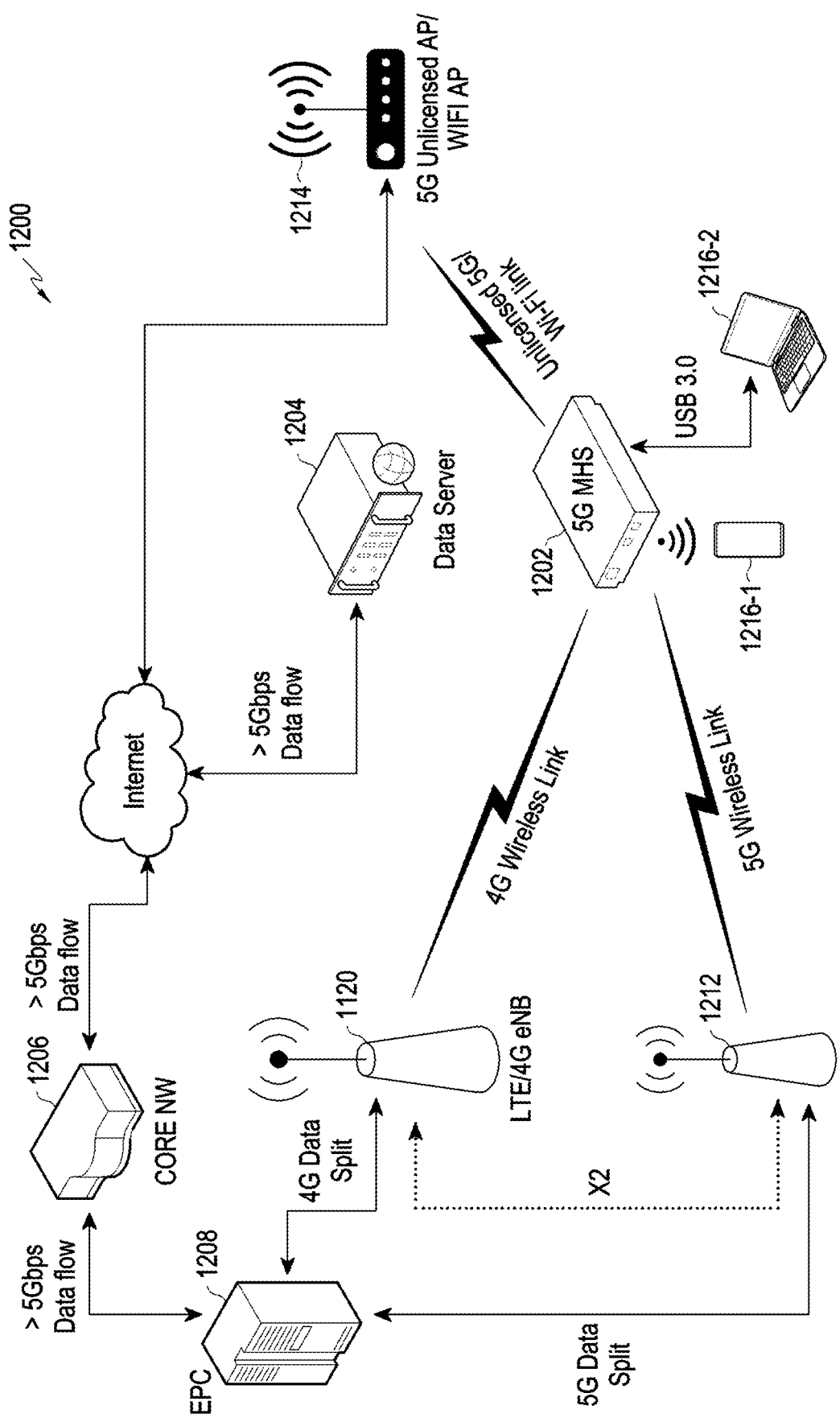
FIG. 12 illustrates another example network environment depicting a communication device availing aggregated spectrum enabled by the apparatus, in accordance with some embodiments of the present disclosure.

FIG. 12 illustrates another example network environment 1200 depicting a communication device 1202 availing aggregated spectrum enabled by the apparatus 614, in accordance with some embodiments of the present disclosure. Examples of the communication device 1202 include, but not limited to, mobile devices such as smartphones, laptops, tablets, smartwatches, etc., desktop, personal digital assistance (PDA). The communication device 1202 may also include the apparatus 614 in a manner as described in earlier figures FIG. 6 to FIG. 11.

The network environment 1200 may include a data server 1204, a core Network (NW) device 1206, and an Evolved Packet Core (EPC) 1208. The data server 1204, the core NW device 1206, and the EPC 1208 may be in communication with each other. In an example, the communication between the data server 1204, the core NW device 1206, and the EPC 1208 may occur at a rate of more than 5 GB per second. Further, the EPC 1208 may be in communication with a Long-Term Evolution (LTE) or a 4G eNodeB (eNB) 1210 and a 5G gNodeB (gNB) 1212. The 4G eNB 1210 and the 5G gNB 1212 may provide a licensed spectrum.

The communication device 1202 may be connected with the 4G eNB 1210 to access 4G connectivity. The communication device 1202 may be connected with the 5G gNB 1212 to access 5G connectivity. The communication device 1202 may now avail aggregated licensed spectrum of 5G and 4G.

Further, the communication device 1202 may be connected with a further access point 1214 providing unlicensed spectrum such as Wi-Fi spectrum and 5G unlicensed spectrums. In an example, the further access point 1214 may be a Wi-Fi access point providing the Wi-Fi spectrum. In an example, the further access point 1214 may be a 5G access point providing unlicensed spectrum. The communication device 1202 may now avail spectrum obtained from combining or aggregating licensed spectrum of 5G and 4G with unlicensed spectrum of Wi-Fi.

Further, the communication device 1202 may operate as mobile hotspot (MHS) access point, in a manner as described earlier. As such, a plurality of devices may be tethered or connected with the hotspot access point. For the sake of brevity, only two devices (hereinafter referred to as "tethered device") are connected. The communication device 1202 may connected to tethered device 1216-1 through LTE connectivity. The communication device 1202 may connected to tethered device 1216-1 through USB connectivity, for e.g., USB 3.0. The tethered device 1216-1 may avail spectrum obtained from combining or aggregating licensed spectrum of 5G and 4G with unlicensed spectrum due to the apparatus 614, in a manner as described earlier. Additionally, traffic or packets from the tethered device 1216-1 may be offloaded to the unlicensed spectrum. This results in less congested licensed spectrum.

Figure 13:
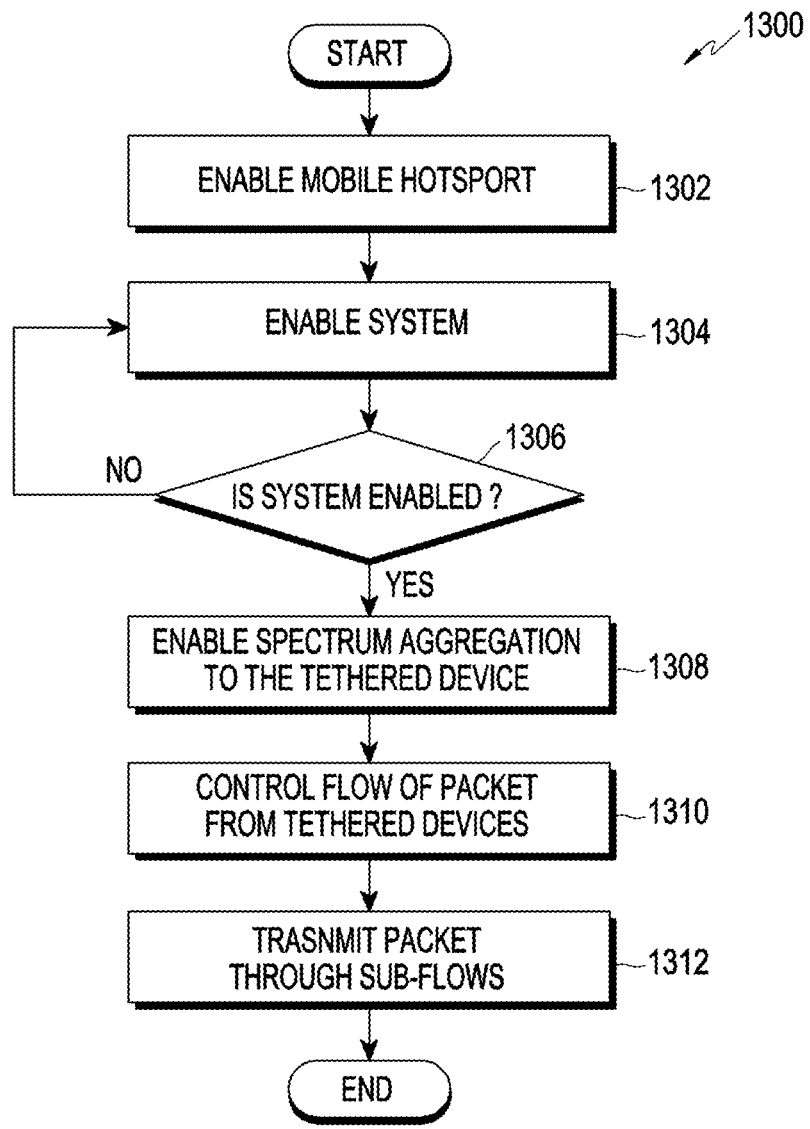
FIG. 13 illustrates an example process flow indicating operation of the apparatus for controlling packet flow, in accordance with some example embodiments of the inventive concepts.

FIG. 13 illustrates an example process flow indicating operation of the apparatus 614 for controlling packet flow when the communication device 602 is operating as a hotspot access point, in accordance with some example embodiments of the inventive concepts. As discussed earlier, the communication device 602 may be availing benefits of spectrum aggregation.

At step 1302, mobile hotspot may be enabled on the communication device 602. In an example, the mobile hotspot may be enabled or activated by selecting a corresponding icon on a settings page. As would be understood, the communication device 602 may operate as the hotspot access point and may enable the tethered devices 610 to connect with the hotspot access point to avail data connectivity. At step 1304, the apparatus 614 may be enabled on the communication device 602. In an example, the processor 802 of the communication device 602 may enable the apparatus 614.

At step 1306, a determination can be made if the apparatus 614 is enabled or not. In an example, the determination can be made by the processor 802. If at step 1306, the apparatus 614 is not enabled, the process flows to step 1304 to enable the apparatus 614. It at step 1306, the apparatus 614 is enabled; the process flows to step 1308.

At step 1308, an aggregated spectrum may be enabled to the tethered devices 610. In conventional apparatuses, a communication device, for e.g., may be connected with both Wi-Fi access point and LTE access point. The communication device may be connected with tethered devices using LTE connectivity or Wi-Fi connectivity. However, the tethered devices may either avail average data speed of 59.5 Mbps provided by the LTE connectivity or avail average data speed of 26.5 Mbps provided by the Wi-Fi connectivity when the communication device operates as MHS, while only the communication device may avail an average combined speed of 71.6 Mbps. The present inventive concepts now enables the tethered devices to also avail the average combined speed of 71.6 Mbps. Table 1 illustrates a comparison of speeds provided by LTE connectivity when the communication device 602 operates as mobile hotspot as known in the art, the Wi-Fi connectivity when the communication device 602 enables Wi-Fi sharing as known in the art, and the aggregated connectivity when the communication device 602 operates as mobile hotspot in accordance with embodiment of the present disclosure. As would be appreciated by a person skilled in the art, Table 1 is included to provide better understanding of the present disclosure and therefore, should not be construed as limiting.

TABLE 1

| No. | Speed test Results(Mbps) | | |
| --- | --- | --- | --- |
| | LTE Tether | Wi-Fi Tether | Wi-Fi + LTE Tether |
| 1 | 59.5 | 26.5 | 71.6 |
| 2 | 45.3 | 26.1 | 60.6 |
| 3 | 25.2 | 29.3 | 48.7 |
| 4 | 63.6 | 23.4 | 60.1 |
| 5 | 66.9 | 22.9 | 54 |
| 6 | 26.6 | 22.9 | 67.9 |
| 7 | 64.6 | 27.4 | 81.4 |
| 8 | 44.3 | 26.8 | 82.2 |
| 9 | 40.6 | 27.8 | 67.4 |
| 10 | 35.6 | 23.8 | 76.4 |
| Average | 47.22 | 25.69 | 67.03 |

As would be gathered from the above table, the apparatus 614 enables tethered devices to avail the benefits of multiple spectrums. Therefore, the tethered devices can avail higher upload/download speed as compared to each of the spectrums so aggregating. Further, the apparatus 614 can aggregate licensed spectrums with unlicensed spectrums. Therefore, an overall cost of download/upload may also be significantly reduced. In addition, time for downloading or uploading of content is also significantly reduced by using the higher speed. This leads to enhanced user-experience as users can now avail higher speeds on their tethered devices for faster and high quality download/upload. Further, Line-of-sight for the hotspot access point is enhanced. In addition, tethered devices not compatible to directly receive any of the connectivity spectrum can also avail the higher speed.

At step 1310, a flow of packets received from the tethered devices 610 may be controlled. As described earlier, the packets may be prevented from being directly forwarded to the output interface of the hotspot access point 602. At step 1312, the packets may be forwarded to the transport layer aggregator 612 to distribute the packets through the plurality of sub-flows, as described earlier. In conventional apparatuses, a communication device, for e.g., may be connected with both Wi-Fi access point and LTE access point. The communication device may be connected with tethered devices using LTE connectivity or Wi-Fi connectivity. The communication device may also implement MPTCP protocol. As such, packets from applications on the communication device may be distributed or transmitted through multiple sub-flows to the two output interfaces. However, packets from the tethered devices are directly forwarded to the output interface of LTE connectivity when the communication device operates as MHS. The present inventive concepts now enable packets from the tethered devices to also be distributed or transmitted through multiple sub-flows to the two output interfaces.

Thus, the present disclosure enables providing aggregation benefits of transport layer aggregator such as aggregated bandwidth of licensed frequency and unlicensed frequency and enhanced throughput to the at least one tethered device. Further, providing aggregation benefits does not need any modification in applications, existing network protocols, kernel, middlebox or server and is platform-independent.

Figure 14:
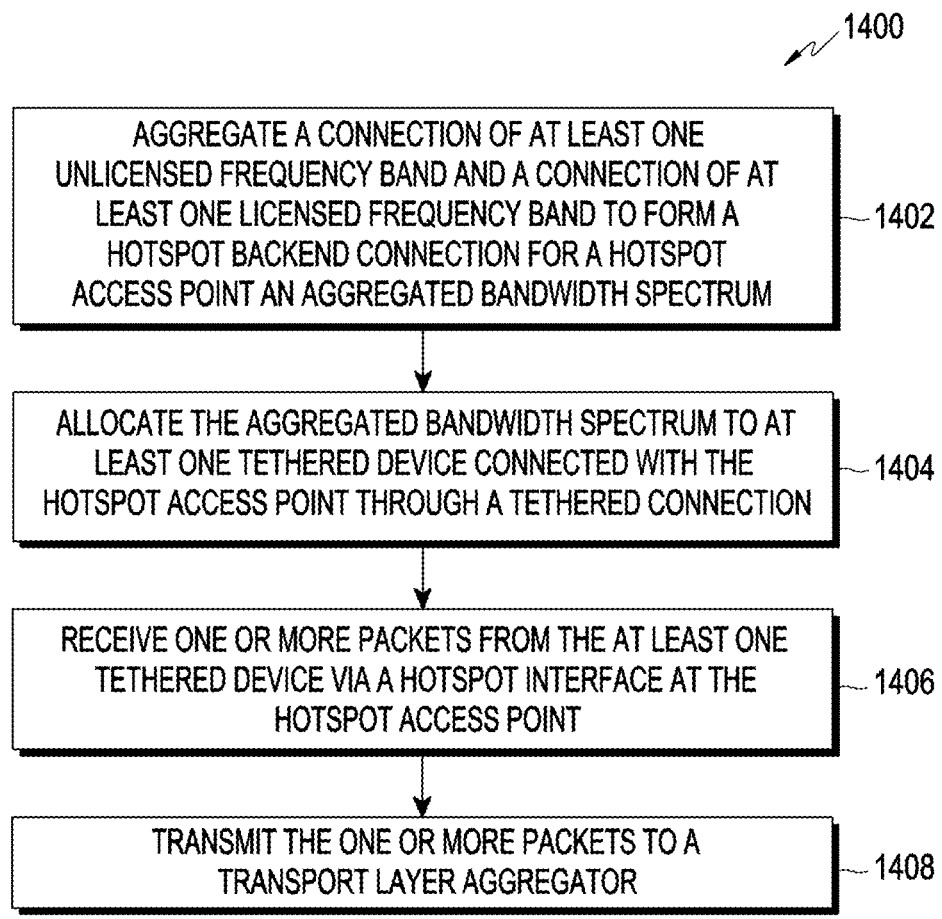
FIG. 14 illustrates a flow diagram for a method for controlling packet flow, in accordance with the embodiment of the present disclosure.

FIG. 14 illustrates a flow diagram for a method 1400 for controlling packet flow, in accordance with the embodiment of the present disclosure. The method 1400 may be implemented in the hotspot access point 602 using components thereof, as described above. In an implementation, the method 1400 may be executed by the apparatus 614 and/or the processor 802. Further, for the sake of brevity, details of the present disclosure that are explained in details in the description of FIG. 6 to FIG. 13 are not explained in detail in the description of FIG. 14.

At block 1402, the method 1400 includes aggregating a connection of at least one unlicensed frequency band and a connection of at least one licensed frequency band to form a hotspot backend connection for a hotspot access point providing an aggregated bandwidth spectrum. For example, the controlling module 710 may provide the aggregated bandwidth spectrum at the hotspot access point 602.

At block 1404, the method 1400 includes allocating the aggregated bandwidth spectrum to at least one tethered device connected with the hotspot access point through a tethered connection. The method 1400 also includes enabling a wireless connectivity to the at least one tethered device through the hotspot backend connection and the tethered connection For example, the controlling module 710 may allocate the aggregated bandwidth spectrum to the least one tethered device 610 and enable wireless connectivity to the at least one tethered device through the hotspot backend connection and the tethered connection.

At block 1406, the method 1400 includes receiving one or more packets from at least one tethered device via a hotspot interface at the hotspot access point. For example, the controlling module 710 may receive the one or more packets from the at least one tethered device 610 via the hotspot interface, swlan0.

At block 1408, the method 1400 includes transmitting the one or more packets to transport layer aggregator. For example, the proxy module 712 may transmit the one or more packets to the transport layer aggregator 612. The transport layer aggregator is defined within a transport layer to provide enhanced features/services. The transport layer aggregator enables at least one of following services: a multi-connectivity service for transmitting packets on multiple flows; a multi-connectivity service for multi-piping; a multi-connectivity service for capacity aggregation; a service for secure packet transmission; a service for packet peeking and routing; and a service for nextgen-transport control protocol. Further, in some example embodiments, the operation of transmitting the one or more encapsulated packets at block 1408 includes additional operations. Accordingly, in some example embodiment, the method 1400 may include preventing a direct transmission of the one or more packets to at least one of a plurality of output interfaces at the hotspot access point. For example, the controlling module 710 may prevent direct transmission of the one or more packets to the output interface for the LTE connectivity, i.e., rmnet0.

In some example embodiments, the method 1400 may include determining at least one communication parameter of the one or more packets. The method 1400 may include encapsulating the one or more packets with at least one encapsulating parameter to form one or more encapsulated packets. The method 1400 may include transmitting the one or more encapsulated packets to the transport layer aggregator based on the at least one communication parameter. For example, the proxy module 712 may encapsulate the one or more packets and transmit the one or more encapsulated packets to the transport layer aggregator 612.

In some example embodiments, the method 1400 may include encrypting at least one of payload, control information, and header in the one or more encapsulated packets to form one or more encrypted packets. The method 1400 may include transmitting the one or more encrypted packets through a plurality of sub-flows of the transport layer aggregator to a plurality of output interfaces at the hotspot access point. For example, the proxy module 712 may encrypt the one or more packets and transmit the one or more encrypted packets to the transport layer aggregator 612.

In some example embodiments, the method 1400 may include detecting an error in one or more sub-flows from the plurality of sub-flows. The method 1400 may include terminating the one or more sub-flows. The method 1400 may include retransmitting the one or more encrypted packets through remaining sub-flows. For example, the proxy module 712 may detect the error in sub-flow 1 and retransmit the packets through sub-flow 2.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. Clearly, the present disclosure may be otherwise variously embodied, and practiced within the scope of the following claims.

The invention claimed is:

1. A method of controlling packet flow, the method comprising:
aggregating, by a hotspot access point, a connection of at least one unlicensed frequency band and a connection of at least one licensed frequency band to form a hotspot backend connection for the hotspot access point providing an aggregated bandwidth spectrum;
allocating, by the hotspot access point, the aggregated bandwidth spectrum to at least one device connected with the hotspot access point through a tethered connection;

receiving, by the hotspot access point, one or more packets from the at least one device in an uplink direction towards one or more host servers via an interface;

determining, by the hotspot access point, at least one communication parameter of the one or more packets;

encapsulating, by the hotspot access point, the one or more packets with at least one encapsulating parameter to form one or more encapsulated packets;

encrypting, by the hotspot access point, at least one of a payload, a control information, and a header in the one or more encapsulated packets to form one or more encrypted packets;

transmitting, by the hotspot access point, the one or more encrypted packets to a plurality of output interfaces based on the at least one communication parameter through a plurality of sub-flows of a transport layer aggregator within a transport layer of the hotspot access point, the plurality of sub-flows comprise at least one sub-flow over the at least one unlicensed frequency band and at least one sub-flow over the at least one licensed frequency band;

detecting, by the hotspot access point, an error in one or more sub-flows from the plurality of sub-flows;

terminating, by the hotspot access point, the one or more sub-flows; and retransmitting, by the hotspot access point, the one or more packets through remaining sub-flows.

2. The method of claim 1, further comprising:
enabling a wireless connectivity to the at least one device through the hotspot backend connection and the tethered connection.

3. The method of claim 1, further comprising:
preventing a direct transmission of the one or more packets to at least one of the plurality of output interfaces at the hotspot access point.

4. An apparatus for controlling packet flow, the apparatus comprising:
at least one processor configured to:
aggregate a connection of at least one unlicensed frequency band and a connection of at least one licensed frequency band to form a hotspot backend connection for a hotspot access point to provide an aggregated bandwidth spectrum;
allocate the aggregated bandwidth spectrum to at least one device connected with the hotspot access point through a tethered connection; and
receive one or more packets from the at least one device in an uplink direction towards one or more host servers via an interface at the hotspot access point;
determine at least one communication parameter of the one or more packets;
encapsulate the one or more packets with at least one encapsulating parameter to form one or more encapsulated packets;
encrypt at least one of a payload, a control information, and a header in the one or more encapsulated packets to form one or more encrypted packets; and
a proxy module coupled to the at least one processor and configured to:

transmit the one or more encrypted packets to a plurality of output interfaces based on the at least one communication parameter through a plurality of sub-flows of a transport layer aggregator within a transport layer of the hotspot access point the plurality of sub-flows comprise at least one sub-flow over the at least one unlicensed frequency band and at least one sub-flow over the at least one licensed frequency band;

detect an error in one or more sub-flows from the plurality of sub-flows;

terminate the one or more sub-flows; and retransmit the one or more packets through remaining sub-flows.

5. The apparatus of claim 4,
wherein the one or more packets is transmitted to the transport layer aggregator, and
wherein the transport layer aggregator is defined within the transport layer and enables at least one of:
a multi-connectivity service for transmitting packets on multiple flows;
a multi-connectivity service for multi-piping;
a multi-connectivity service for capacity aggregation;
a service for secure packet transmission;
a service for packet peeking and routing; and
a service for nextgen-transport control protocol.

6. The apparatus of claim 4, wherein the at least one processor is further configured to:
enable a wireless connectivity to the at least one device through the hotspot backend connection and the tethered connection.

7. The apparatus of claim 4, wherein the at least one processor is further configured to:
prevent a direct transmission of the one or more packets to at least one of the plurality of output interfaces at the hotspot access point.

8. The apparatus of claim 4, wherein the at least one communication parameter comprises a size of the one or more packets, a quality of service, and a reliability factor.

9. The apparatus of claim 4, wherein the at least one encapsulating parameter comprises at least one of a device address of the hotspot access point and a reference address of the at least one device.

10. The method of claim 1, wherein the transport layer aggregator is defined within the transport layer and enables at least one of
a multi-connectivity service for transmitting packets on multiple flows;
a multi-connectivity service for multi-piping;
a multi-connectivity service for capacity aggregation;
a service for secure packet transmission;
a service for packet peeking and routing; and
a service for nextgen-transport control protocol.

11. The method of claim 1, wherein the at least one communication parameter comprises a size of the one or more packets, a quality of service, and a reliability factor.

12. The method of claim 1, wherein the at least one encapsulating parameter comprises at least one of a device address of the hotspot access point and a reference address of the at least one device.

* * * * *